Feb. 26, 1963 A. L. COLARUSSO 3,079,057
FOOD PACKAGES
Filed July 13, 1961

3,079,057
FOOD PACKAGES
Augustine L. Colarusso, Boston, Mass., assignor to Van Brode Milling Co., Inc., Clinton, Mass., a corporation of Massachusetts
Filed July 13, 1961, Ser. No. 123,898
3 Claims. (Cl. 229—3.5)

The present invention relates to improvements in packaging. More particularly, the invention is concerned with packaging individual servings of jellies, jams, preserves, condiments, or other foods which may be conveniently served in restaurants, and the like, and also in homes.

The invention pertains more specifically to a container which is hermetically sealed by a cover that is adapted to be conveniently and easily peeled off.

It has been heretofore proposed to employ, as a cover, aluminum foil coated with a suitable thermoplastic adhesive, such as a lacquer, to effect the closure. However, it has been found that, when the seal is broken by peeling off the aluminum foil cover, particles of the thermoplastic adhesive adhere to the container and also project over the interior thereof. This condition is objectionable since it not only impedes the removal of the contents of the container but creates an unappetizing situation.

It has also been heretofore proposed to employ, as a cover, aluminum foil coated with a suitable thermoplastic adhesive, such as a vinyl resin, to effect the closure. However, it has been found that, in order to form the necessary bond between the cover and the container, a similar coating must be applied to that area of the container which is to contact with the cover. The use of a rigid polystyrene container, formed by injection molding, does not permit the application of a coating of vinyl resin without marring the surface with crazing and discoloration. In addition, the resulting bond is unsatisfactory. For the purpose of eliminating the disadvantages of said lacquer coating, such as peeling off from the aluminum foil and projecting over interior of the container, it has been found necessary to apply a priming coating to the aluminum foil.

The main object of the present invention is to clear away the difficulties above referred to in the sealing of food containing receptacles.

Another object of the invention is to provide a receptacle cover of the type referred to which is simple in construction and inexpensive to manufacture, and which permits the sealed receptacle to be easily opened without special implements.

Further objects of the invention will be obvious from the following description.

One of the many possible embodiments of the invention is disclosed in the accompanying drawings, in which.

Figure 1:
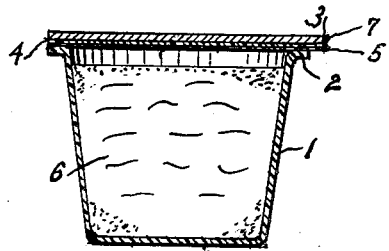
FIGURE 1 is a central vertical section taken through the improved package.
Figure 2:
FIG. 2 is an exaggerated cross-section of a portion of the improved receptacle cover.

The receptacle 1, proper, may be conveniently formed of polystyrene to provide a rigid cup of any suitable cross-section, e.g. of substantially circular, square or rectangular shape in horizontal cross-section. The size of the cup is predetermined by the quantity of the food product it is to contain. At its open end, the receptacle 1 is provided all around with an outwardly projecting flange 2. The receptacle cover includes an aluminum foil base 3, first coated on one face thereof with a thermoplastic adhesive 4, such as a vinyl resin dissolved in adhesive quality (e.g. vinyl VMCH, produced by Union Carbide Plastic Co.). After the vinyl resin is permanently bonded to the aluminum foil 3, following the evaporation of the solvent thereof, a coating of nitrocellulose thermoplastic lacquer 5, with low nitrogen content up to the tetranitrate, is applied to overlay the vinyl resin. Instead the nitrocellulose lacquer, "Proxseal" heat-sealing Lacquer No. 27–121, produced by Pyroxylin Products Co., Inc., may be employed.

The aluminum foil, prepared as described, is heat-sealed to the flange 2 of the cup 1, after the latter has been charged with the food 6, thereby providing a hermetically sealed closure.

For the purpose of permitting convenient removal of the cover from the cup, the cover is extended at one point of the cup a substantial distance beyond the flange 2, as shown at 7 (FIG. 1).

Despite the fact that the cover closes the cup hermetically and will withstand all normal service conditions, it may be removed from the cup by gripping with the fingers the cover seciton 7 and peeling off the cover without difficulty and without tearing the cover.

What I claim is:

1. A food container in the form of a cup provided at its open end with an outwardly projecting flange, a cover heat-sealed to said flange and comprising an aluminum foil base, a coating of a vinyl resin adhesive applied to said aluminum foil base, and a thermoplastic lacquer coating applied to said vinyl coating.

2. A food container according to claim 1, said cup being formed of polystyrene.

3. A food container according to claim 1, the thermoplastic applied to the vinyl coating being a nitrocellulose lacquer.

References Cited in the file of this patent

UNITED STATES PATENTS

| | | |
|---|---|---|
| 2,695,115 | Roop | Nov. 23, 1954 |
| 2,878,128 | Jorgenson | Mar. 17, 1959 |
| 2,951,765 | Robson | Sept. 6, 1960 |

FOREIGN PATENTS

| | | |
|---|---|---|
| 489,760 | Great Britain | Aug. 2, 1938 |